United States Patent [19]

Mayfield et al.

[11] Patent Number: 5,615,389
[45] Date of Patent: Mar. 25, 1997

[54] METHOD AND SYSTEM FOR DEVICE RESOURCE RESOLUTION IN A DATA PROCESSING SYSTEM

[75] Inventors: Brandon J. Mayfield; Chris A. Schwendiman, both of Round Rock, Tex.

[73] Assignee: International Business Machines Corporation, Armonk, N.Y.

[21] Appl. No.: 511,201

[22] Filed: Aug. 4, 1995

[51] Int. Cl.$^6$ .................................................. G06F 13/00
[52] U.S. Cl. .................. 395/828; 395/822; 395/823; 395/829; 395/830; 395/856
[58] Field of Search .............................. 395/500, 11, 822, 395/823, 828, 829, 830, 856; 364/200; 340/172.5

[56] References Cited

U.S. PATENT DOCUMENTS

| | | | |
|---|---|---|---|
| 3,680,052 | 7/1972 | Arulpragasam et al. | 340/172.5 |
| 5,016,162 | 5/1991 | Epstein et al. | 364/200 |
| 5,021,943 | 6/1991 | Grimes | 364/200 |
| 5,282,272 | 1/1994 | Guy et al. | 395/200.06 |
| 5,325,510 | 6/1994 | Frazier | 395/445 |
| 5,329,626 | 7/1994 | Klein et al. | 395/375 |
| 5,450,570 | 9/1995 | Richek et al. | 395/500 |
| 5,450,750 | 9/1995 | Abler | 73/149 |
| 5,504,837 | 4/1996 | Griffeth et al. | 395/11 |

*Primary Examiner*—Thomas C. Lee
*Assistant Examiner*—David Ton
*Attorney, Agent, or Firm*—Andrew J. Dillon

[57] ABSTRACT

A method and system for assigning non-conflicting bus resources to a plurality of devices connected to that bus. The system provides for resolution of resources for all devices attached to the bus or for just a subset of the devices attached to the bus. The system provides for special types of relationships between bus resources; "grouped" resources allow a device to control the selection of a value for one resource based on the value of a different resource, and "shared" resources allow two or more different devices to share a single bus resource. First, a list of the devices attached to the bus is constructed, and for each device a list of the device's bus resources (attributes) is also constructed. The system then prunes unusable bus resource values from the attribute lists, based on what is allowed by the particular machine and bus to which the device is connected. The system then begins a search to find the first non-conflicting solution which will resolve each device in the device list in turn. If a device is determined to be irresolvable at any stage then the system continues to attempt to resolve any remaining devices. Some devices may share interrupt levels with other devices; this system attempts to assign unique and non-conflicting bus resources for all devices, but if a unique interrupt level assignment may not be made the system will attempt to find a suitable "shareable" interrupt level currently assigned to another device which may also be assigned to the first device.

11 Claims, 8 Drawing Sheets

METHOD AND SYSTEM FOR DEVICE RESOURCE RESOLUTION IN A DATA PROCESSING SYSTEM

BACKGROUND OF THE INVENTION

1. Technical Field

The present invention relates, in general, to providing resource resolution in a data processing system, and, more specifically, to resolving resources to non-conflicting values for those specified as allowable for a particular device within a data processing system. Further, the present invention relates to selecting unique non-conflicting values from various permissible sets of values for resolving resource conflicts of various devices attached to a bus within a data processing system.

2. Description of the Related Art

In a typical data processing system, several devices are attached to a bus within the processing system and require system resources in order to function properly. Additionally, the operating system, or other software support, detects which devices are attached to the bus and what system resources are needed for the devices to operate properly. Many times resource conflicts occur with respect to which device has access at which time. The operating system is used to resolve the resources to non-conflicting values from those specified as allowable for the device.

One solution to this problem has been to use a table swap algorithm for processing conflicting device attributes, but has been found to be deficient in that not all possible values are explored in the search for a solution. Specifically, when the operating system searches to resolve resource conflicts, conflicting values were assigned in some instances and there was no logical method for predicting which devices would have thier resource requirements resolved when a solution for all resource requirements did not exist.

Accordingly, what is needed is an improved method and system for a data processing system to resolve resource allocation conflicts amongst various devices connected within the data processing system via a bus. This method and system should be able to select unique non-conflicting values from various permissible sets of values and address any specific requirements within the operating system's resource specification to optimize or at least enhance performance.

SUMMARY OF THE INVENTION

It is therefore an object of the present invention to provide resource resolution in a data processing system.

It is a further object of the present invention to resolving resources to non-conflicting values for those specified as allowable for a particular device within a data processing system.

It is yet a further object of the present invention to selecting unique non-conflicting values from various permissible sets of values for resolving resource conflicts of various devices attached to a bus within a data processing system.

The foregoing objects are achieved as is now described. According to the present invention, a method of resolving resource conflicts between a plurality of devices within a data processing system is disclosed that allows the plurality of devices to share resources within the data processing system. The method is able to resolve the conflicts automatically without a user needing to intervene. To begin, the method performs a search for a first non-conflicting solution for each of the plurality of devices to be configured and then constructs a first data structure representing the devices based on this search. Next, the system constructs a second data structure for each of the devices representing the attributes of each device. The system then begins to resolve a selected first device and then cycles through for each succeeding device later on, against all previously resolved devices found on the first data structure or list. During this time the system also determines all the shared attributes that are non-conflicting bus resource values for the device being resolved.

When constructing the first data structure, the system determines which of the plurality of devices are available and which of those devices are defined, and then places the available devices at the beginning of the data structure list with the defined devices after the available devices. The available devices are those devices that have already been resolved while the defined devices are those that have yet to be resolved. The second data structure consists of a list of attributes for each of the devices within the system. During the resolution phase of the method, the system selects a device from the first data structure and determines if that devices is irresolvable. The system also saves a current state of the system during resolution so that if the device is not resolvable the system can return to that current state saved and begin again in resolving the next device. To determine if the device is resolvable, the system determines whether there are sufficient bus resources for the device and if so, matches that device against all the previously resolved devices according to the list of attributes on the second data structure. The system then completes its resolution by processing each attribute on the list in the second data structure.

Next, the system determines any shareable interrupts that are possible in the event a particular device have not been resolved. Once a shared interrupt has been selected, an assigned interrupt table is built for listing all the unresolved attributes for each device. Next, the system determines if any of the shared interrupts are available and then matches each of these unresolved attributes with a shared interrupt giving priority to the lowest use count until an appropriate solution is obtained.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
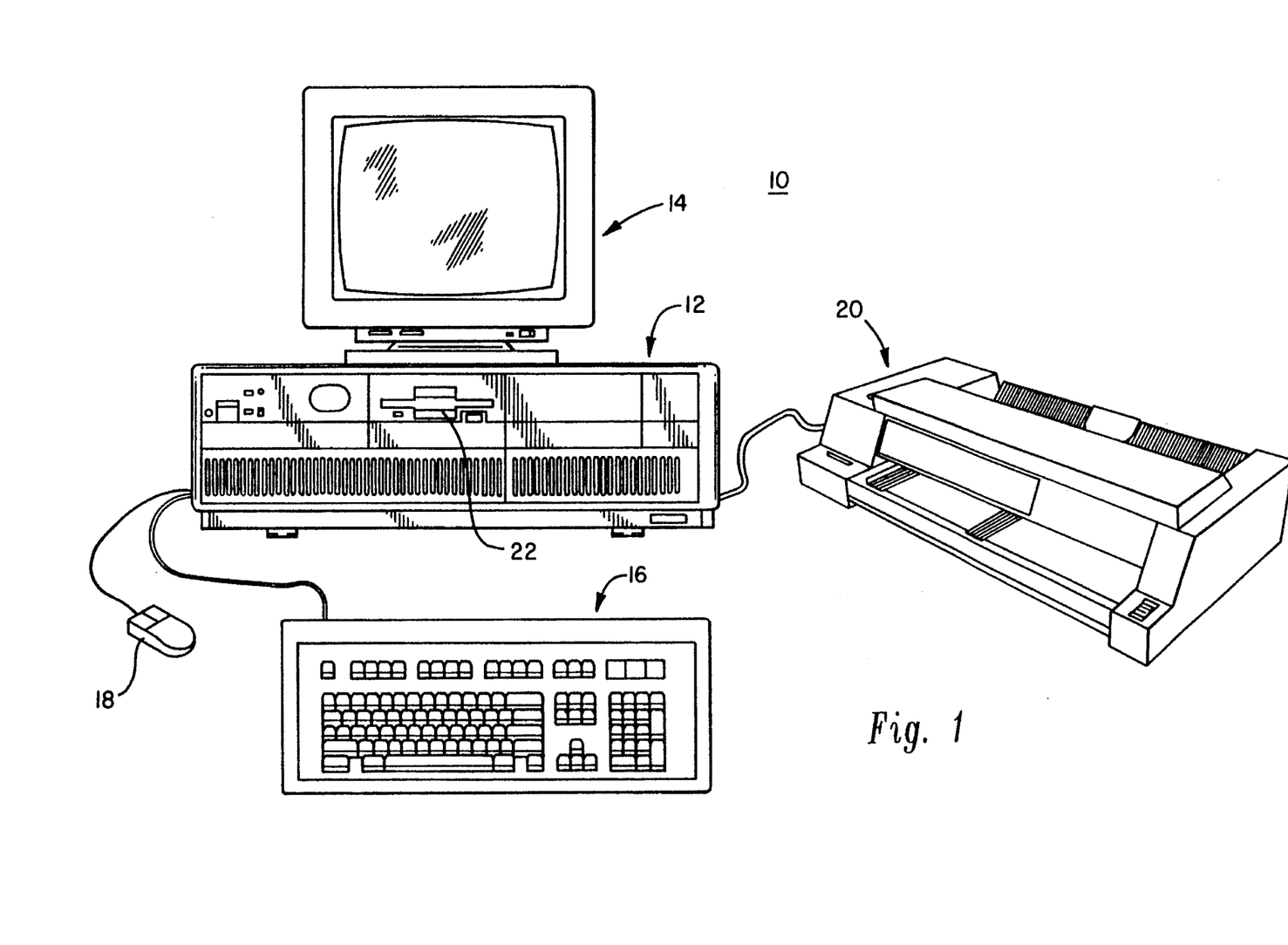
FIG. 1 depicts in accordance with a preferred embodiment of the present invention a data processing system, personal computer system, in which the present invention can be employed

Referring now to the figures, and in particular to FIG. 1, a data processing system, personal computer system 10, in which the present invention can be employed is depicted. As shown, personal computer system 10 comprises a number of components, which are interconnected together. More particularly, a system unit 12 is coupled to and can drive an optional monitor 14 (such as a conventional video display). A system unit 12 also can be optionally coupled to input devices such as a PC keyboard 16 or a mouse 18. Mouse 18 includes right and left buttons (not shown). The left button is generally employed as the main selector button and alternatively is referred to as the first mouse button or mouse button 1. The right button is typically employed to select auxiliary functions. The right mouse button is alternatively referred to as the second mouse button or mouse button 2. An optional output device, such as a printer 20, also can be connected to the system unit 12. Finally, system unit 12 may include one or more mass storage devices such as the diskette drive 22.

As will be described below, the system unit 12 responds to input devices, such as PC keyboard 16, the mouse 113, or local area networking interfaces. Additionally, input/output (I/O) devices, such as floppy diskette drive 22, display 14, printer 20, and local area network communication system are connected to system unit 12 in a manner well known. Of course, those skilled in the art are aware that other conventional components also can be connected to the system unit 12 for interaction therewith. In accordance with the present invention, personal computer system 10 includes a system processor that is interconnected to a random access memory (RAM), a read only memory (ROM), and a plurality of I/O devices.

In normal use, personal computer system 10 can be designed to give independent computing power to a small group of users as a server or a single user and is inexpensively priced for purchase by individuals or small businesses. In operation, the system processor functions under an operating system, such as IBM's OS/2 operating system or DOS. OS/2 is a registered trademark of International Business Machines Corporation. This type of operating system includes a Basic Input/Output System (BIOS) interface between the I/O devices and the operating system. BIOS, which can be stored in a ROM on a motherboard or planar, includes diagnostic routines which are contained in a power on self test section referred to as POST.

Figure 2:
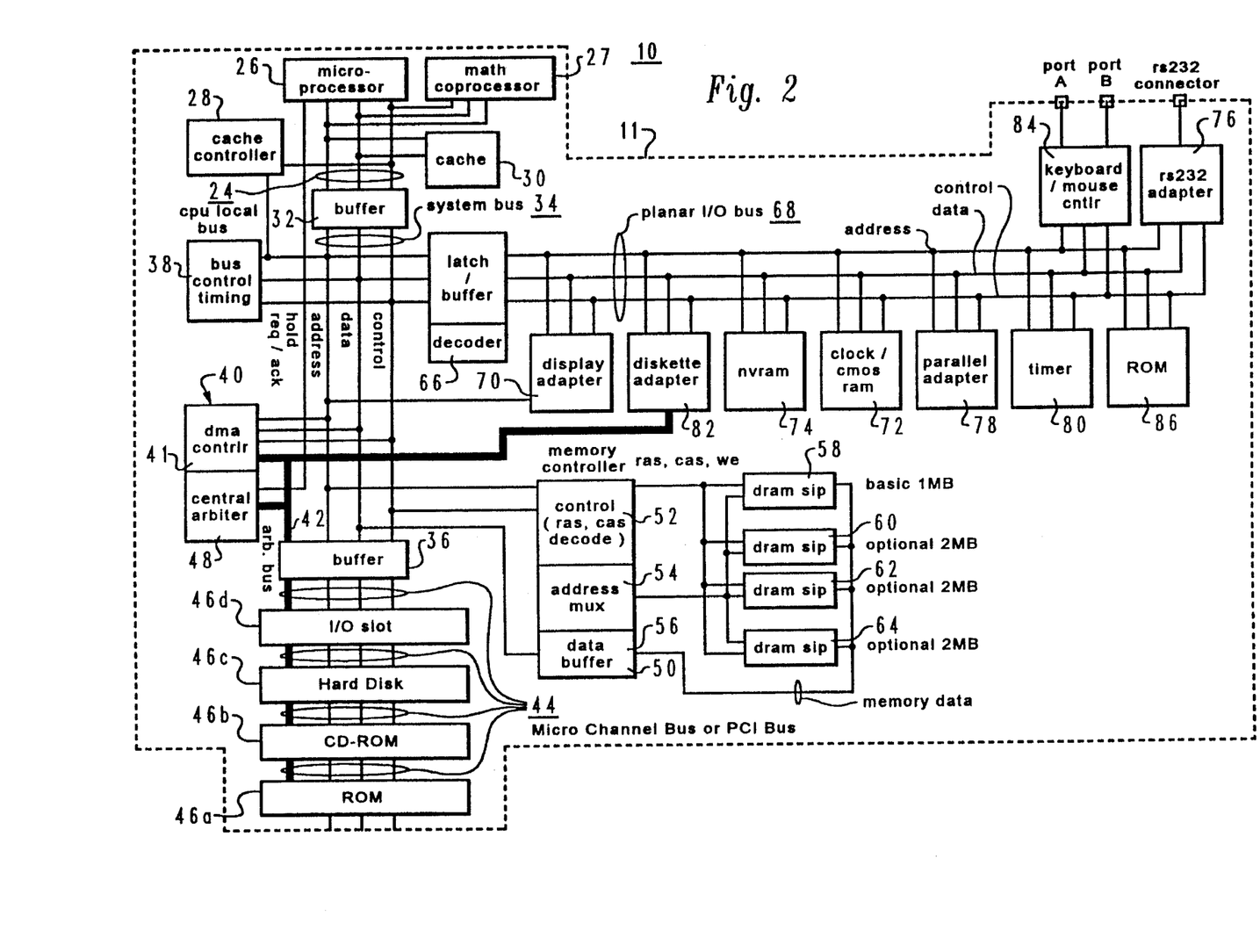
FIG. 2 is a block diagram of personal computer system illustrating the various components of personal computer system in accordance with the present invention.

Prior to relating the above structure to the present invention, a summary of the operation in general of personal computer system 10 may merit review. Referring to FIG. 2, there is shown a block diagram of personal computer system 10 illustrating the various components of personal computer system 10 in accordance with the present invention. FIG. 2 further illustrates components of planar 11 and the connection of planar 11 to I/O slots 46a–46d and other hardware of personal computer system 10. Connected to planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used for CPU 26, one suitable microprocessor is the Power PC microprocessor, which is sold by IBM Corporation. "Power PC" is a trademark of IBM Corporation.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board. For example, the system processor could be an Intel 80386, 80486 or Pentium microprocessor. These particular microprocessors can operate in a real addressing mode or a protected addressing mode. Each mode provides an addressing scheme for accessing different areas of the microprocessor's memory.

Returning now to FIG. 2, CPU local bus 24 (comprising data, address and control components) provides for the connection of CPU 26, an optional math coprocessor 27, a cache controller 28, and a cache memory 30. Also coupled on CPU local bus 24 is a buffer 32. Buffer 32 is itself connected to a slower speed (compared to the CPU local bus) system bus 34, also comprising address, data and control components. System bus 34 extends between buffer 32 and a further buffer 36 System bus 34 is further connected to a bus control and timing unit 38 and a Direct Memory Access (DMA) unit 40. DMA unit 40 is comprised of a central arbitration unit 48 and a DMA controller 41. Buffer 36 provides an interface between the system bus 34 and a serial bus. Connected to bus 44 are a plurality of I/O slots 46a–46d for receiving adapter cards, which may be further connected to an I/O device or memory. In the depicted example, I/O slot 46a has a hard disk drive connected to it; I/O slot 46b has a CD-ROM drive connected to it; and I/O slot 46c has a ROM on an adapter card connected to it. An arbitration control bus 42 couples the DMA controller 41 and central arbitration unit 48 to I/O slots 46 and diskette adapter 82. Also connected to system bus 34 is a memory control unit 50 which is comprised of a memory controller 52, an address multiplexor 54, and a data buffer 56. Memory control unit 50 is further connected to a random access memory as represented by RAM module 58. Memory controller 52 includes the logic for mapping addresses to and from CPU 26 to particular areas of RAM 58. While the personal computer system 10 is shown with a basic 1 megabyte RAM module, it is understood that additional memory can be interconnected as represented in FIG. 2 by the optional memory modules 60 through 64.

A further buffer 66 is coupled between system bus 34 and a planar I/O bus 68. Planar I/O bus 68 includes address, data, and control components respectively. Coupled along planar bus 68 are a variety of I/O adapters and other peripheral components such as display adapter 70 (which is used to drive an optional display 14), a clock 72, nonvolatile RAM 74 (hereinafter referred to as "NVRAM"), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

Clock 72 is used for time of day calculations. NVRAM 74 is used to store system configuration data. That is, the NVRAM will contain values which describe the present configuration of the system. For example, NVRAM 74 contains information which describe the capacity of a fixed disk or diskette, the type of display, the amount of memory, etc. Of particular importance, NVRAM 74 will contain data which is used to describe the system console configuration; i.e., whether a PC keyboard is connected to the keyboard/mouse controller 84, a display controller is available or the ASCII terminal is connected to RS232 adapter 76. Furthermore, these data are stored in NVRAM 74 whenever a special configuration program is executed. The purpose of the configuration program is to store values characterizing the configuration of this system to NVRAM 76 which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

Specifically, personal computer system 10 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and "PS/2" is a registered trademark of International Business Machines Corporation.

During initial power-up and system booting, and during machine configuration, the system configures the machine so that all integrated peripherals and bus devices obtain a solution to their resource requirements for each attached device. This method resolves system resource requirements for planar integrated and bus devices. It relies on a first level recursive resolution to ensure non-conflicting values are assigned for each device resource. First, the method performs an exhaustive search for the first non-conflicting solution for each device to be configured. This exhaustive search is then supplemented to meet the input data specification requirements for AIX devices, handle special relationships between device resources, such as group and share attributes and shared bus interrupt levels, provide pruning or ordering of the possible values to optimize the resource resolution, and allow resolution for a subset of all the devices in a particular machine configuration.

Within the ODM system, input data or device resource specifications, are provided as records, also known as device attributes. The ODM is a relational data base provided with AIX, which retains information about the data processing system and its peripherals and devices. The current embodiment of this invention utilizes the ODM as a source for information about the data processing system. This dependency could be eliminated without affecting the operation of this invention. Additional details of the ODM and the data provided with AIX is available in the standard AIX User and Technical documentation. These records describe the type, amount, and possible values for each resource requirement for each device. The system handles all the types of resources in device major order, thereby allowing quick prediction of the outcome in the event of an irresolvable conflict. The types of resources include shareable bus interrupt levels, non-shareable bus interrupt levels, Direct Memory Access (DMA) arbitration levels, bus IO addresses, TCE/TCW mapped bus memory, and non-TCE/TCW mapped bus memory. The possible values for each resource are specified in either a range or list notation. A list is described by: elem1, elem2, ... elemN where each possible value is enumerated in the list. A range notation is described by: LOWVAL–HIGHVAL, increment where the resource may be reserved at each LOWVAL+n* increment boundary, with n=0, . . ., (HIGHVAL–LOWVAL)/increment.

Device attributes are provided to allow sharing of resources between two or more devices, or grouping of two or more attributes. Thus, the Share and Group attributes describe relationships between other bus resource attributes.

Grouped attributes are described by a sequence of elem1, elem2, ... elemN for each attribute in the group. A selection of elem2 as the non-conflicting value for one attribute results in selection of elem2 for each of the other attributes in the group. The group is treated as a single entity by method, meaning that all group members are incremented and scanned for conflicts simultaneously by the system.

Shared attributes are handled by this method by hiding all but the first shared attribute from the resolution process and code that detects conflicts in the attributes list. After resolution, an assignment of shareable bus interrupt levels is completed. Second and subsequent shared attributes are then assigned the same current value as the first shared attribute that has been resolved.

Figure 3:
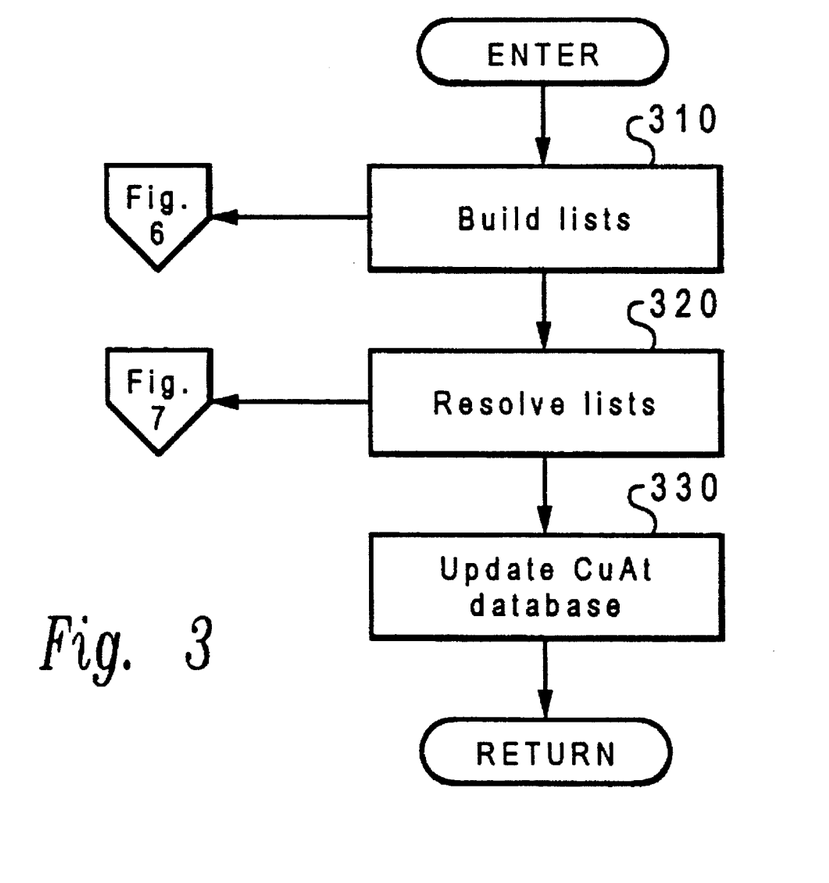
FIG. 3 depicts a flowchart of the steps generally used to perform resource resolution.
Figure 4:
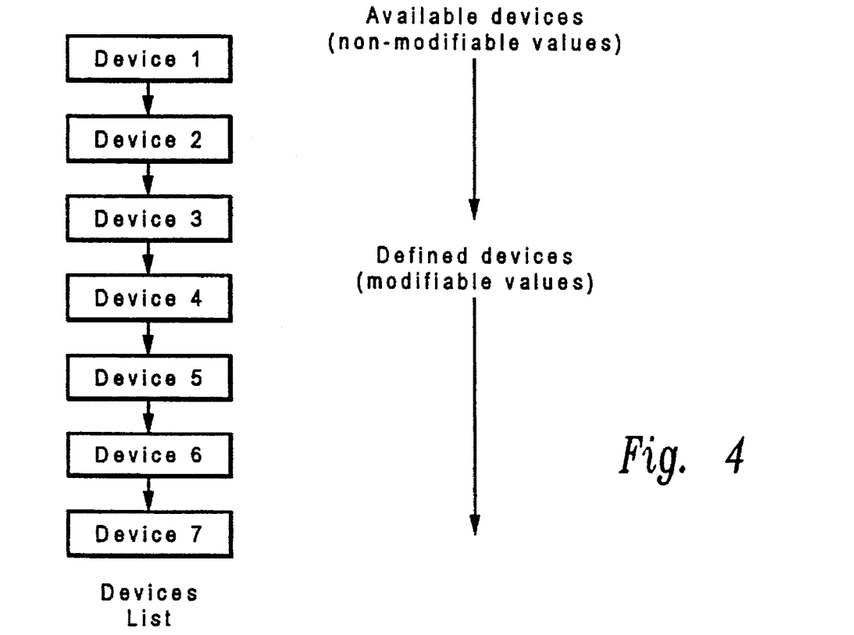
FIG. 4 is a representation of the device list.

FIG. 3 depicts a flowchart of the steps generally used to perform resource resolution. This includes constructing data structures representing devices (FIG. 4) and device attributes (FIG. 5) prior to resolution of the bus resources. To begin, in block 310, a list of all devices in the system is built. The flowchart of FIG. 6 further depicts the list building function of block 310. The device list is ordered first by available devices, and second, by defined devices. A pictorial representation of the device list is shown in FIG. 4. In block 610, the system determines whether the device list has been completed. If not the system proceeds to block 612 where the system retrieves the next device and then in block 614 adds that device to the list. Once the list is completed, the list proceeds to block 616.

Figure 5:
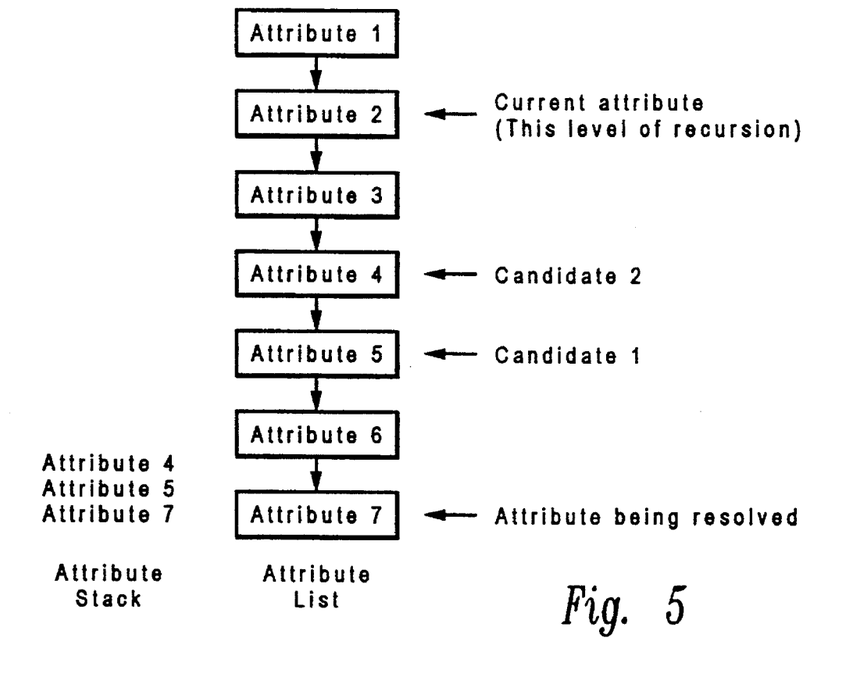
FIG. 5 is a representation of the attribute list.
Figure 6:
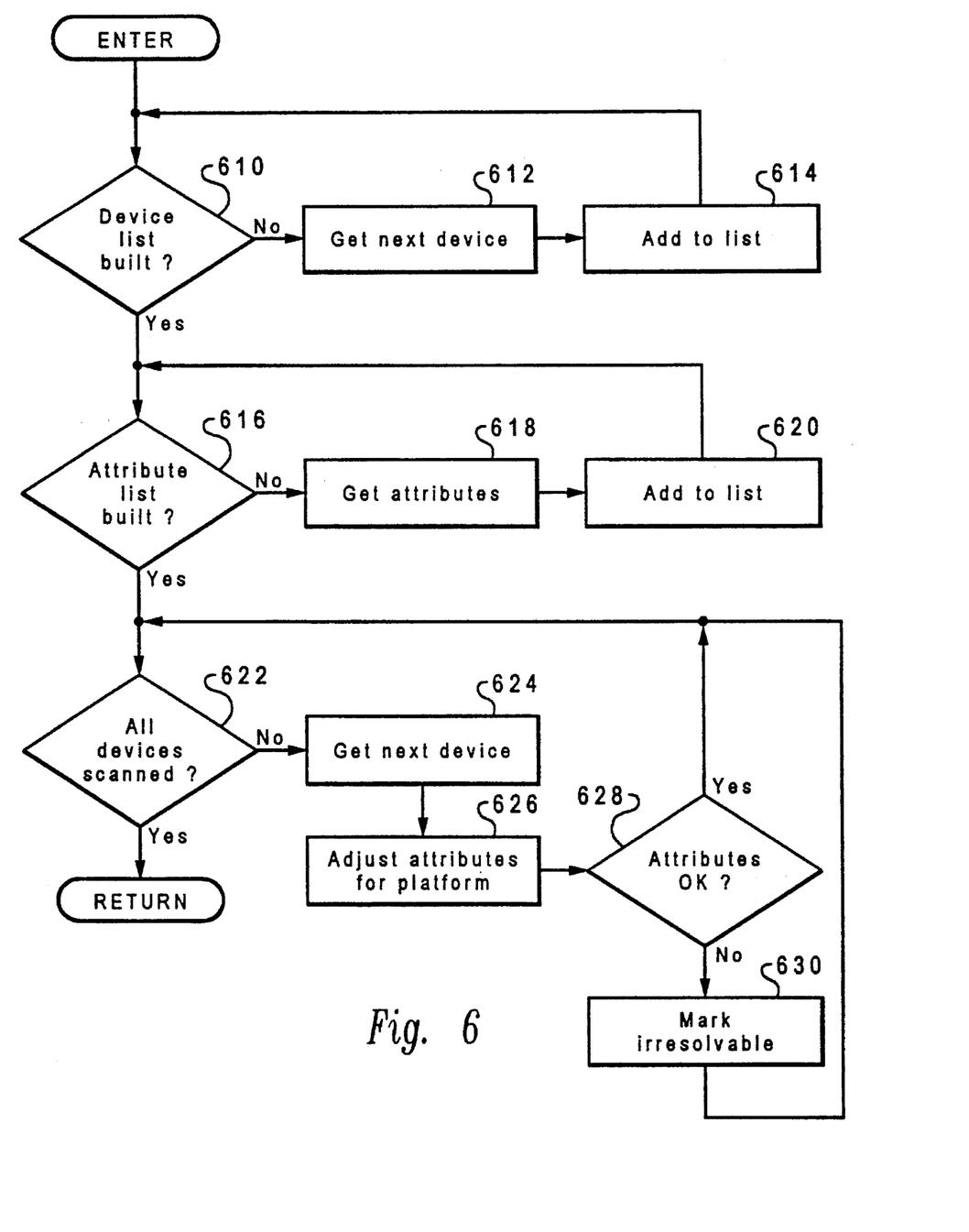
FIG. 6 depicts the list building function.

At this point, for each device in the device list, a list of attributes in constructed, which list of attributes is illustrated in FIG. 5. In block 616, the system determines whether the attribute list has been built, and if not proceeds to step 618 where the system gets the attributes associated with the device on the list and adds these attributes to the list until completed. Once the list has been completed, the system proceeds to block 622.

Once the device and attributes lists are built, the step is to prune all unusable values from the possible values lists of the attributes. A value might be unusable because it is not supported on a particular bus or platform (computer model). This provides a first order resolution of possible values and is geared towards maximizing performance. First, in block 622, the system determines whether all devices have been scanned and if not proceeds to the next available device in block 624. Next, in block 626, the system adjusts the attributes for the particular system platform and bus specific code and limitations. Next, in block 628, the system determines whether the attributes are acceptable and if not, the attributes are marked irresolvable. Once the attributes have been marked irresolvable or the attributes have been deemed to be okay, the system returns to block 622 until all devices are scanned. Interfaces are provided to establish the specific functions which need to be called when a new bus type is to be supported.

Figure 7:
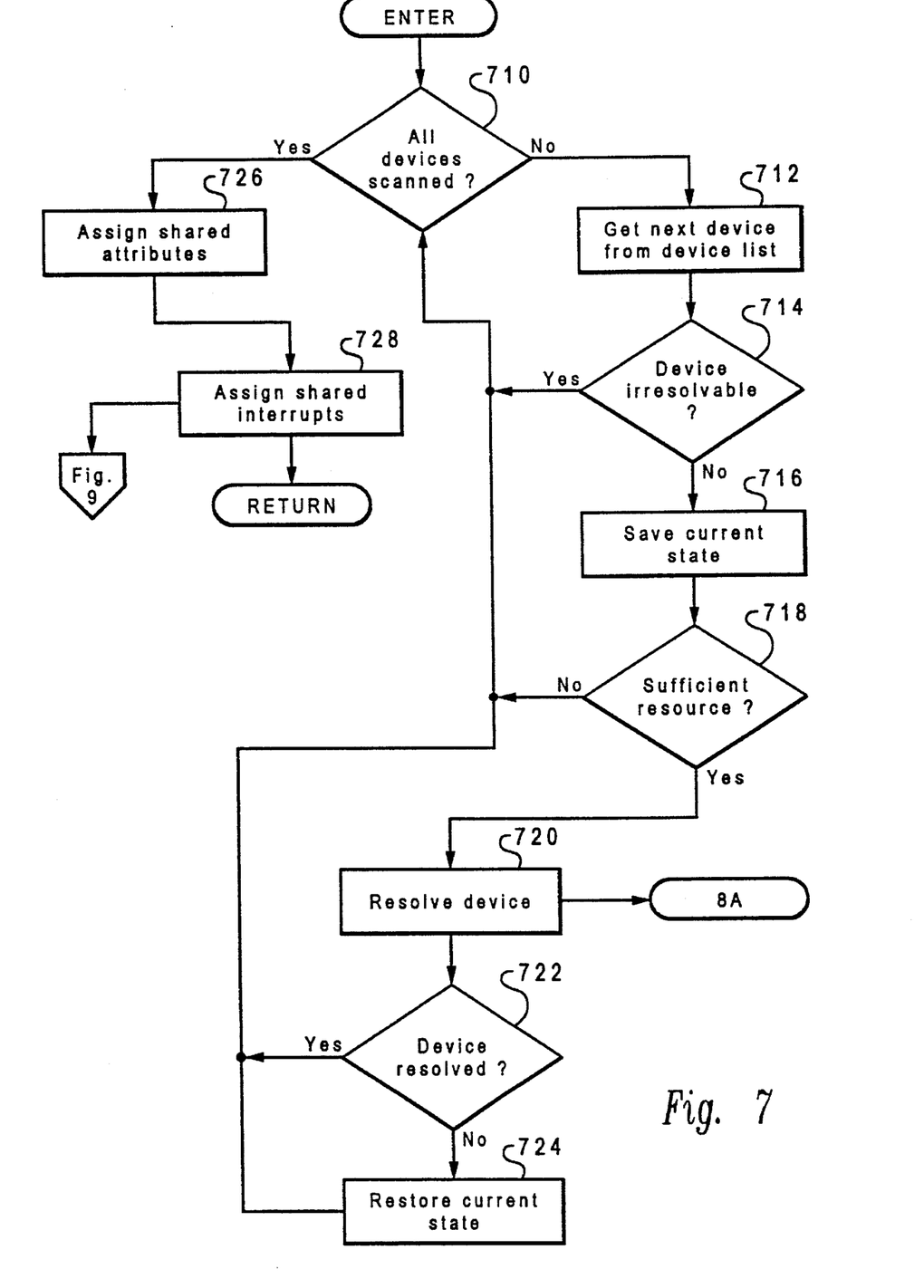
FIG. 7 depicts the resolution of each device in the device list.

Returning to FIG. 3, in block 320, which is more fully expanded in FIG. 7, resolution of each device in the device list is begun. Each defined device remains in the defined state, meaning all of its bus resource attributes are modifiable until all of the defined devices are resolved. Available devices may not have any of their bus resource attributes modified during this resolution, but are included so that their bus resource attribute values may be compared against the defined devices to determine conflicting situations. Note that during system boot all devices are defined; at times other than system boot, most devices typically will be available while one (or a few) device(s) will be defined.

More specifically, in FIG. 7, the system begins by determining whether all devices have been scanned in block 710, and if not, proceeds to block 712. In block 712, the system retrieves the next device from the device list of FIG. 4. Next, each device in the device list is checked to see it if has been marked irresolvable, in block 714), this being in some cases a consequence of validating all bus resource possible values against what is valid for a particular bus and platform. If the device is not already marked irresolvable, then the current state of resolution is saved in block 716). If, in block 722, the device cannot be resolved, then, in block 724, this saved state will become the current state before proceeding to the next device. After the current state is saved (block 716), then each device attribute is checked, in block 718, to see if the bus and platform provide sufficient available resources to satisfy the requests and if not, returns to block 710. The checking of available bus resource provides a second order of resolution performed by the system.

Thus far, the system has started resolution on the first device to be configured, saves the state of the current level of resolution, resolves all the device's attributes if possible, and continues to the next device.

Figure 8:
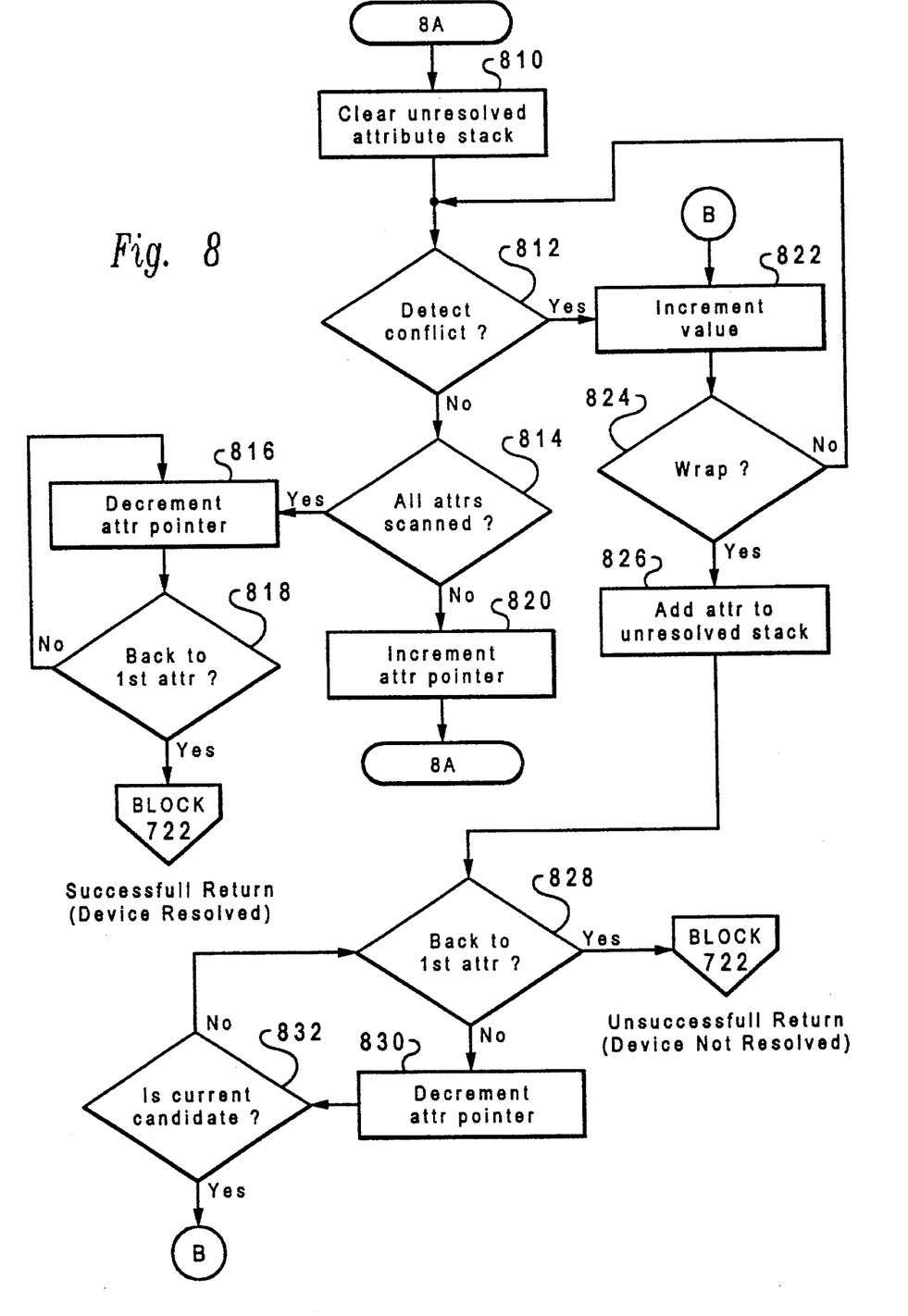
FIG. 8 depicts recursive blocks representing calls and returns.

If sufficient bus resource is available, then the actual non-conflicting bus resource values are determined in block 720, which is expanded in FIG. 8. FIG. 8 includes recursive blocks representing calls and returns. Point "A" of FIG. 8 is the initial entry point for resolution of each device's bus resources.

On entry to block A of FIG. 8, the current attribute pointer points to the first attribute in the attribute list which is shown in FIG. 5. This is the first attribute of the first defined device, which must not be confused with the first attribute of the current defined device (device being resolved). The unresolved attributes stack is cleared in block 810, then in block 812 the current attribute is compared against all other attributes in the attribute list up to but not including itself, to see if there is a conflict. If there is no conflict, then a check is performed at block 814 to see if all attributes for this device have been checked. If all attributes have been checked the recursion quickly unwinds in the loop depicted by blocks 816–818. In block 816, the system decrements the attribute pointer by one and then returns back, then in block 818 determines whether the system should return back to the first attribute, if not it returns back to block 816, otherwise, the system has successfully completed the resolution of the device and returns to block 722 of FIG. 7. On the other hand if there are more attributes to check, then the current attribute pointer is incremented to the next attribute in block 820 and a recursive call is made to block 8A of FIG. 8 as depicted "8A" in the flowchart.

So far we have described the sequence for a device that was resolved with all of its "current" bus resource values— no adjustment was needed to rectify a conflict, as no conflicts were detected. The function of FIG. 8 made recursive calls to invoke itself for each defined device's attribute up to and including the last attribute for the device being resolved; this is depicted in the flowchart by the flow from block "8A" at the top of the page through block "8A" below block 820. Having checked all attributes and detected no conflicts, the function of FIG. 8 returned from each recursive call via the loop of blocks 816 and 818.

A second sequence of resolution is now described and addresses a device with an attribute that must be incremented to a new value to resolve a conflict. At this time the system has made several recursive calls, but at block 812 a conflict is detected with another attribute. In this case block 822 is executed. Since there is a detected conflict at this point, block 822 increments the current attribute to a value sufficient to resolve the conflict in a single increment (the new non-conflicting value is computed, not obtained through iteration). Next, in block 824 it checks the system to see if the attribute "wrapped", or had all its possible values exhausted when it was incremented to the new value. Assuming the attribute did not "wrap", the logic flow returns to the "defect conflict" test in block 812. In this fashion, as long as new conflicts are found and the current attribute's possible values are not exhausted, the system follows the path described through blocks 812, 822, and 824.

The third sequence of resolution is performed when the possible values for the attribute in conflict are exhausted during the attempt to increment to a non-conflicting value as was just described. In this scenario, the result of the "wrap" test at block 824 is True, and block 826 is executed. In block 826 a reference to the current attribute is saved on a global stack called the unresolved attribute stack. This stack is used to keep track of all the attributes that wrapped as recursion unwinds in block 830. As recursion unwinds, each new current attribute is tested to see if it would be a candidate to resolve the conflict in block 832.

A candidate attribute is an attribute which has a current value that is the same as any possible value of any attribute on the unresolved attributes stack. Incrementing the current attribute to a value that frees up one of the possible values of one of the attributes on the unresolved attributes stack might solve the conflict.

So, in block 832, if the current attribute is not a candidate, then the system returns to block 828, and recursion unwinds to the next attribute. However, if the current attribute is a candidate, the path to block "B" is followed, resulting in the execution of block 822. Note that in this case, there is no current conflict; the current attribute is incremented to its next value, tested for wrapping in block 824 and tested for conflicts in block 812.

If block 828 detects that the first defined device's first attribute is the current attribute, then all possible combinations have been tried and the device being resolved could not be resolved successfully and the system returns to FIG. 7. If the attribute that caused the irresolvable condition is a shareable bus interrupt, then that attribute is ignored, and an attempt to assign the interrupt to a non-unique value is made later.

Once all devices are scanned, meaning attempt to resolve whether or not it was successful block 710 will evaluate to True, and block 726 is executed. Block 726 assigns shared attributes. Shared attributes have already been described— here we simply copy the value from the non-hidden attribute which was resolved to a unique value to all of its shared partners.

Figure 9:
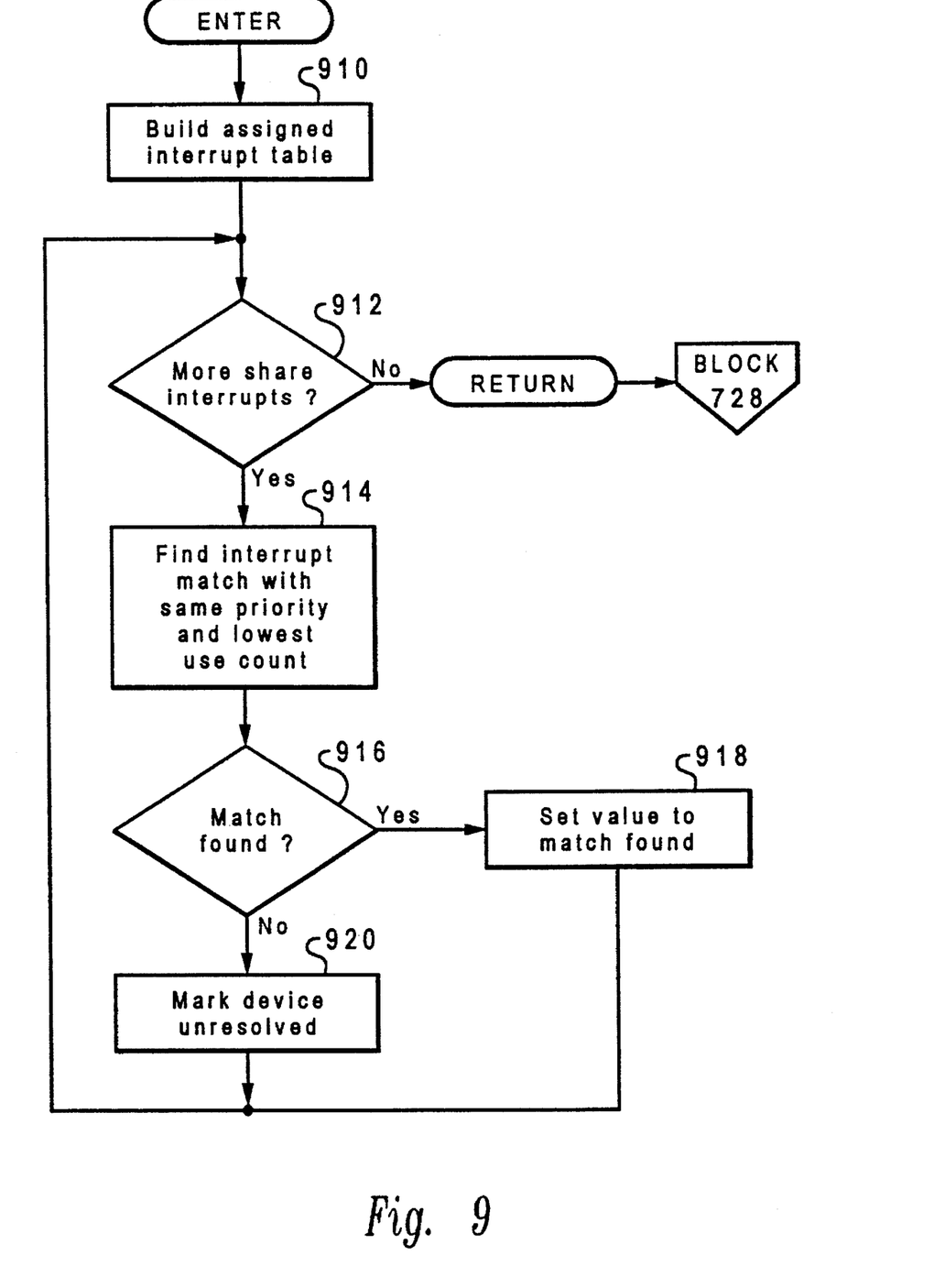
FIG. 9 depicts sharable interrupts that could not be resolved uniquely.

Sharable interrupts that could not be resolved uniquely are assigned in block 728 which is expanded in FIG. 9. First, in block 910, a table of the uniquely assigned interrupts is built. This table includes the interrupt number, priority class value, and use count. Selection of a priority class value for a device is based upon information contained in the IBM publication "Writing a Device Driver for AIX Version 4.1". In block 912, if there are no more unassigned shared interrupts to process the system returns to FIG. 7, (see block 728); otherwise, block 914 is executed. Block 914 searches the entire table for a match with the sharable interrupt attribute; such a match must have an interrupt number and priority class that is compatible with the sharable interrupt. Also, when more than one possible match exists, the match used is that one with the lowest use count. If a match is found, then block 916 evaluates true and the sharable bus interrupt attribute's current value is set to the value of the match (block 918) and the use count for that value is incremented by one. If a suitable match is not found, then block 920 is executed, and the device with the sharable bus interrupt is marked unresolved. In either case processing continues by selecting the next sharable bus interrupt until block 912 evaluates as False.

Note that details of the matching of shareable interrupts are different for different bus types. An interface is defined for establishing a callback function, registered for each device, which determines how to match a shareable bus interrupt with an assignment bus interrupt. This bus independent approach is similar to the pruning of usable values accomplished prior to resolution—each bus type may define its own rules for pruning unusable values and matching sharable bus interrupt levels.

Once all resources are resolved and shared attributes are assigned, the specific values are saved in the ODM, as "Customized Attributes" (CuAt records). This final operation is represented by block 330, FIG. 3.

While the invention has been particularly shown and described with reference to a preferred embodiment, it will be understood by those skilled in the art that various changes in form and detail may be made therein without departing from the spirit and scope of the invention.

We claim:

1. In a data processing system having a plurality of devices coupled to a bus and having attributes for accessing resources within said data processing system, a method of resolving resource conflicts between said plurality of devices, comprising:

performing a search for a first nonconflicting solution for each of said plurality devices to be configured;

constructing a first data structure representing each of said plurality of devices based on said search said first data structure comprising an ordered list beginning with available devices having nonmodifiable attributes and thereafter listing defined devices having modifiable attributes;

constructing a second data structure for each of said plurality of devices representing the attributes of each device;

resolving a selected first defined device against all previously resolved or available devices found on said first data structure;

determining shared attributes that are nonconflicting bus resource values for said resolved first defined device;

assigning all shared attributes as specific values;

saving said specific values within an object database management file; and recursively repeating said resolving process for a next defined device within said first data structure until all defined devices have been resolved.

2. The method according to claim 1 wherein said step of constructing said second data structure further comprises: developing a list of attributes for each of said devices.

3. The method according to claim 1 wherein said step resolving each of said plurality of devices further comprises:

selecting a device from said first data structure;

determining if said device is irresolvable;

determining if said system has sufficient bus resources for said device;

if said device is resolvable and there are sufficient bus resources, matching said device against said previously resolved device according to said second data structure;

determining whether said second data structure for each of said device have been analyzed for resolution.

4. The method according to claim 3 further comprising:

prior to said resolving step, saving a current system state;

if said device is unresolvable, returning said system to said saved current system state; and selecting a next device yet to be resolved for resource resolution.

5. The method according to claim 1 further comprising:

selecting a sharable interrupt for a particular device not being resolvable according to said second data structure.

6. The method according to claim 5 further comprising:

building an assigned interrupt table of all resolved interrupt attributes for each device;

determining if any shared interrupts are available;

matching each of said unresolved attributes with a shared interrupt having the same priority and the lowest use count.

7. In a data processing system having a plurality of devices coupled to a bus for accessing resources within the data processing system, a method of resolving resource conflicts between said plurality of devices, comprising:

determining which of said plurality of devices are already resolved and which of those devices are yet to be resolved;

selecting a first device among said plurality of devices yet to be resolved;

selecting all resource attributes for said first device so that only selected values valid for a specific resource and system configuration are chosen;

maintaining a list of all currently assigned values;

marking a device as being irresolvable if said devices attributes cannot be resolved;

restoring said system to a state prior to resolution of said device found to be irresolvable based on said list;

comparing an attribute of an unresolved device with the attributes of those devices already resolved;

selecting an attribute value that does not conflict with those attributes of those devices already resolved;

selecting a candidate attribute for said unresolved attribute; and determining whether said candidate attribute conflicts with an immediately prior attribute.

8. The method according to claim 7 further comprising the step of:

upon resolving all device attributes, constructing a table of assigned bus interrupt levels;

assigning any unassigned sharable bus interrupt levels values that are identical to other shareable bus interrupt level assignments;

performing load balancing of said shared interrupts to minimize the number of interrupts shared at a given level.

9. The method according to claim 7 further comprising:

prior to said selecting said first device step, saving a current system state;

if said device is unresolvable, returning said system to said saved current system state; and selecting a next device yet to be resolved for resource resolution.

10. The method according to claim 7 further comprising:

saving all nonconflicting resolved attributes within an object database management file.

11. In a data processing system have a plurality of devices coupled to a bus for accessing resources within said data processing system, a method of resolving resource conflicts between said plurality of devices, comprising:

constructing a list of devices according to device structure;

separating said plurality of devices on said list into either a first category or a second category;

selecting a device from said second category;

comparing said selected device against all of the remaining said plurality of devices to determine any conflicting situation;

constructing a list of bus resource attributes associated with each of said plurality of devices;

selecting only those bus resource attributes having modifiable values;

saving a system state of all currently assigned values among said plurality of devices and said bus resource attributes;

determining whether said selected devices attributes can be resolved with respect to said plurality of bus resource attributes;

determining whether said selected device has a shareable bus interrupt with any other of said plurality of devices;

determining whether said selected device conflicts with any attributes of said devices within said first category;

sharing an attribute of a device in said first category that does conflict with an attribute within said selected device;

upon obtaining a conflict, selecting a candidate attribute to resolve said conflict.

* * * * *